United States Patent [19]

Jensen et al.

[11] Patent Number: 4,678,202
[45] Date of Patent: Jul. 7, 1987

[54] FOLDING WHEELCHAIR

[75] Inventors: Tom M. Jensen, Everett; Frederick T. Yoshimura, Seattle; Deborah P. Jensen, Everett, all of Wash.

[73] Assignee: The Boeing Company, Seattle, Wash.

[21] Appl. No.: 922,217

[22] Filed: Oct. 23, 1986

Related U.S. Application Data

[63] Continuation of Ser. No. 811,068, Dec. 19, 1985, Pat. No. 4,640,525.

[51] Int. Cl.⁴ ............................................. B62B 7/08
[52] U.S. Cl. ................................... 280/642; 280/650; 280/47.4; 297/59; 297/DIG. 4
[58] Field of Search ................... 297/59, DIG. 4, 130, 297/131, 331, 14, 417; 108/119, 160; 280/641, 642, 648, 650, 47.34, 47.4, 657

[56] References Cited

U.S. PATENT DOCUMENTS

| 6815 | 12/1875 | Born | 297/59 X |
| 2,407,786 | 9/1946 | Keest | 297/59 X |
| 2,615,725 | 10/1952 | Person | 280/642 X |
| 2,685,325 | 8/1954 | Webster | 280/642 X |
| 3,215,469 | 11/1965 | Wamsley | 297/130 X |
| 4,290,502 | 9/1981 | Anderson | 297/59 X |

Primary Examiner—John J. Love
Assistant Examiner—Michael Mar
Attorney, Agent, or Firm—H. Gus Hartmann; B. A. Donahue

[57] ABSTRACT

A folding chair assembly for dual use as a wheelchair or a flight attendant's seat onboard a commercial passenger airplane. The folding chair assembly can be manipulated into any of the following modes: (1) fully retracted into a compact assembly that can be stowably secured by a plurality of catches against a vertical wall in the passenger compartment of an aircraft; (2) with the chair assembly still secured to the wall, the seat pan is pulled down against a seat return spring and is usable as a flight attendant's seat; and (3) the folded chair assembly is completely detached from the plurality of retaining catches and fully extended to function as a wheelchair that is usable down the aisles of commercial passenger aircraft.

6 Claims, 7 Drawing Figures

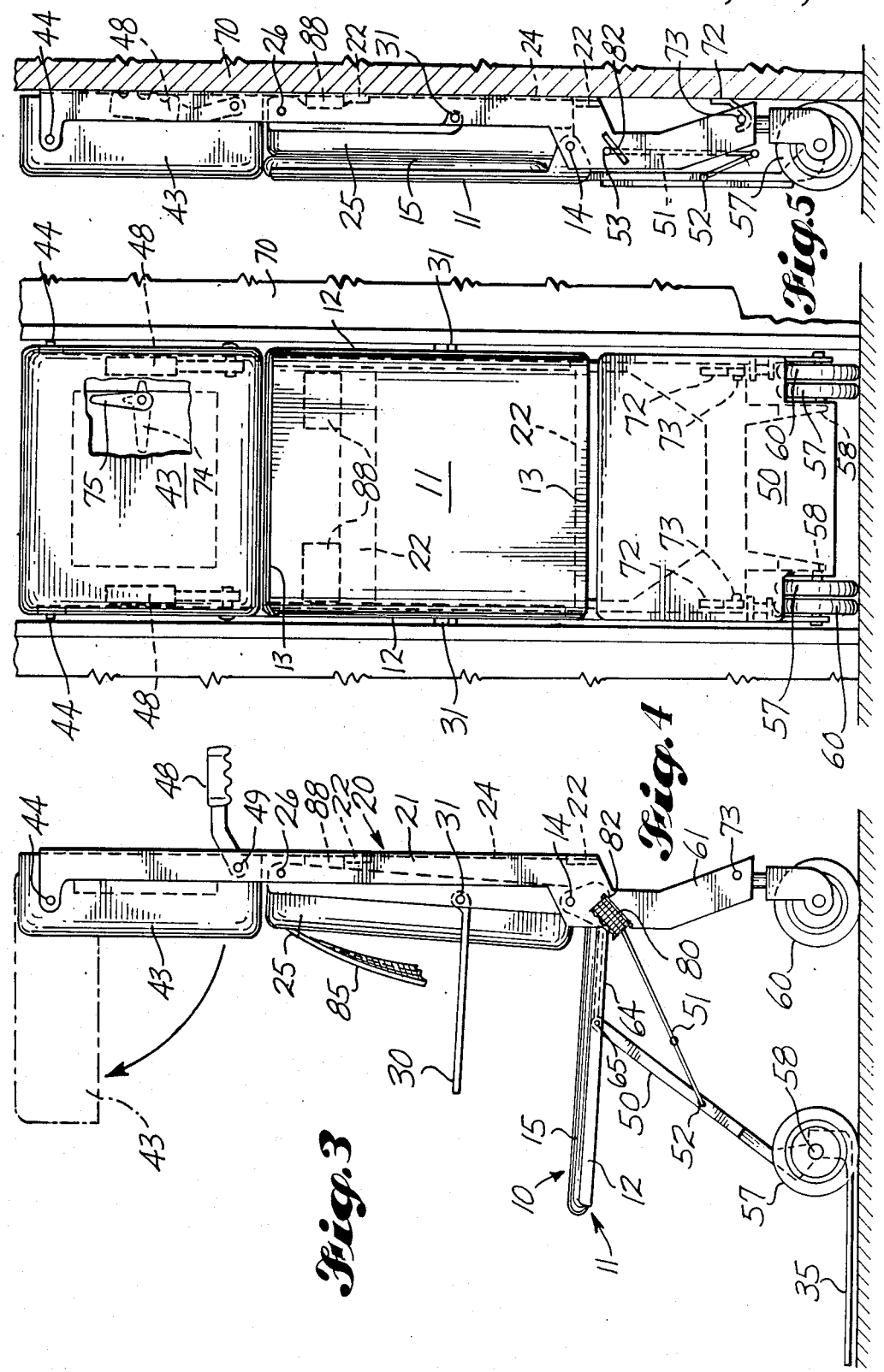

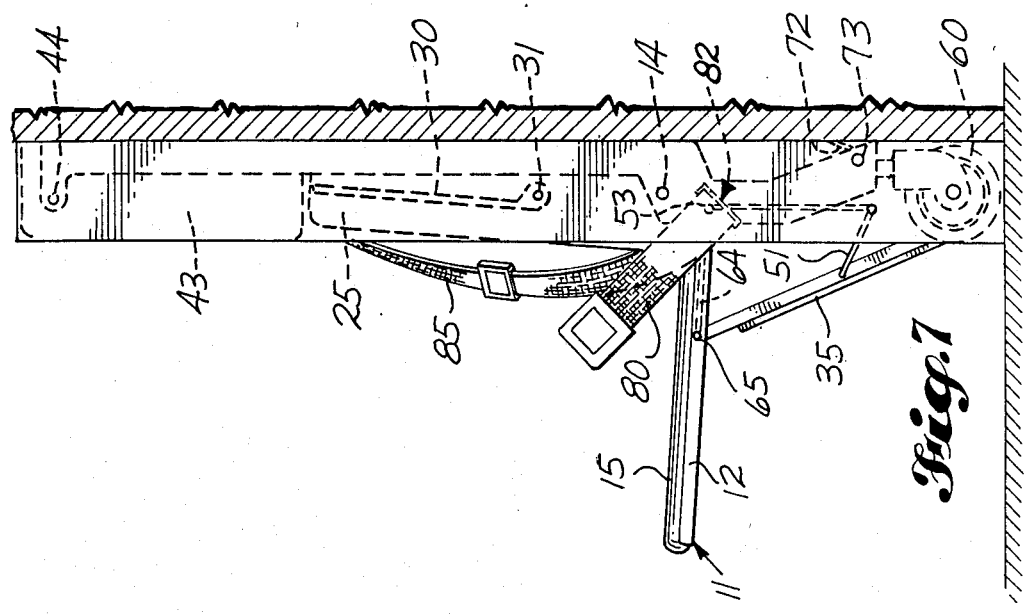
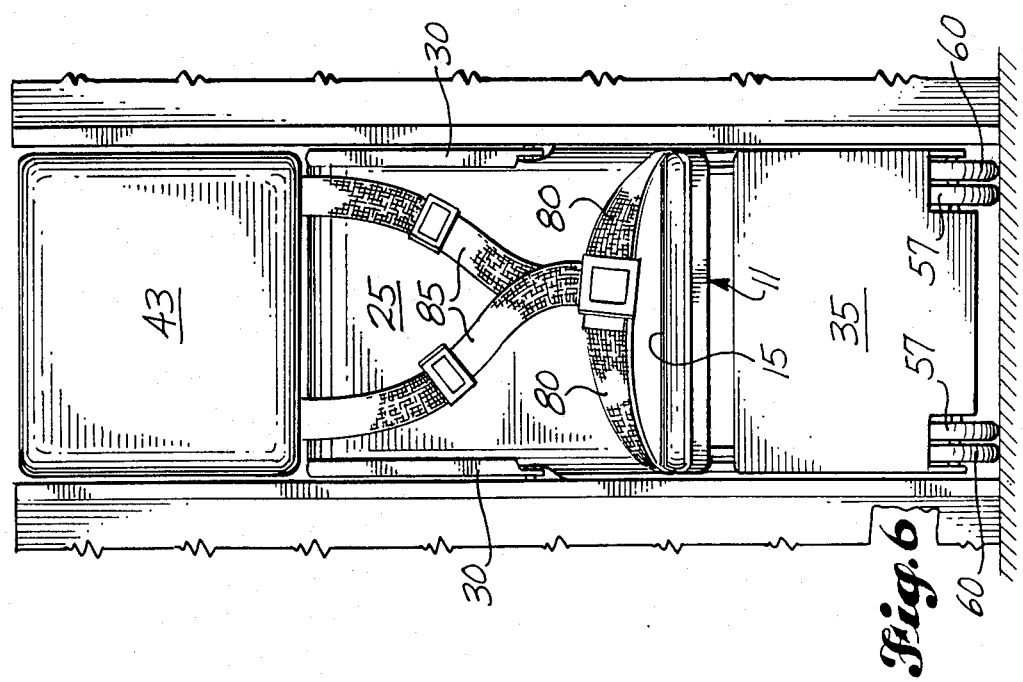

FOLDING WHEELCHAIR

This is a continuation of application Ser. No. 811,068, filed Dec. 19, 1985, now U.S. Pat. No. 4,640,525.

SUMMARY OF THE INVENTION

Airline passengers requiring a wheelchair are generally boarded first on an airplane with the assistance of flight attendants and transferred from a conventionally designed wheelchair adjacent thereto. Once aboard the airplane, the handicapped passenger is pretty much restricted to the confines of his or her seat. Therefore, commercial passenger airplanes have an in-flight need to accommodate handicapped passengers who are confined to wheelchairs and to provide some means onboard the airplane for handicapped persons to leave their seats and go down the aisle to use the lavatory facilities, with assistance from flight attendants. It is virtually impossible to maneuver a conventionally sized wheelchair down the aisle of a passenger compartment in a commercial airliner; and in the event of an aircraft emergency requiring the evacuation of all passengers, it is extremely difficult to evacuate an invalid person without the assistance of a wheelchair. Generally, there is no wheelchair onboard a commercial passenger airplane for use by handicapped passengers that can be maneuvered down the aisle of the passenger compartment.

There is no doubt that passengers requiring the assistance of a wheelchair would feel a sense of personal satisfaction if they could utilize an onboard wheelchair to maneuver down the aisle with the assistance of a flight attendant.

The invention relates to a wheelchair assembly which is approximately 16 inches in width to permit use in the aisle of most commercial airplane passenger compartments, and which also serves as a flight attendant's seat when secured against a vertical bulkhead in an airplane compartment. Further, both the wheelchair assembly and the flight attendant's seat embodiment are compactly foldable for stowage. The limited stowage space required makes this invention useful on other public transportation vehicles, e.g., trains, busses, ships, etc. The seating arrangement onboard an airplane for flight attendant's use is sometimes such that it is located in a throughway area which requires clearance during passenger ingress or egress periods, and at these locations it is necessary that the attendant's seat be automatically folded or biased to a folded position when unoccupied, in order to provide bypass clearance.

An object of the invention is to provide means onboard a commercial airline passenger compartment for a wheelchair-bound person to leave his or her seat and move along an aisle, with assistance from a flight attendant.

Another object is to provide a wheelchair narrow enough to be maneuvered in the aisle with the assistance from a flight attendant.

An advantage of the invention is that it is foldable in a front-to-back sequence from a wheelchair configuration to a compact unit for stowage, whereas known foldable wheelchairs collapse in a side-to-side manner.

Another object is to provide a wall-supported flight attendant's seat embodiment which is crash safety secured to vertical structure of the aircraft when occupied by a flight attendant and designed for use as a wheelchair when removed from the wall support and unfolded.

BRIEF DESCRIPTION OF THE DRAWINGS

FIG. 3 is a side elevational view of the wheelchair shown in FIG. 1;

FIG. 4 is a front elevational view of the wheelchair embodiment in the folded and stowed position;

FIG. 5 is a side elevational view of FIG. 4;

FIG. 6 is a front elevational view of the flight attendant's seat embodiment of the invention; and FIG. 7 is a side elevational view of the flight attendant's seat in FIG. 6.

DESCRIPTION OF THE PREFERRED EMBODIMENTS

Figure 2:
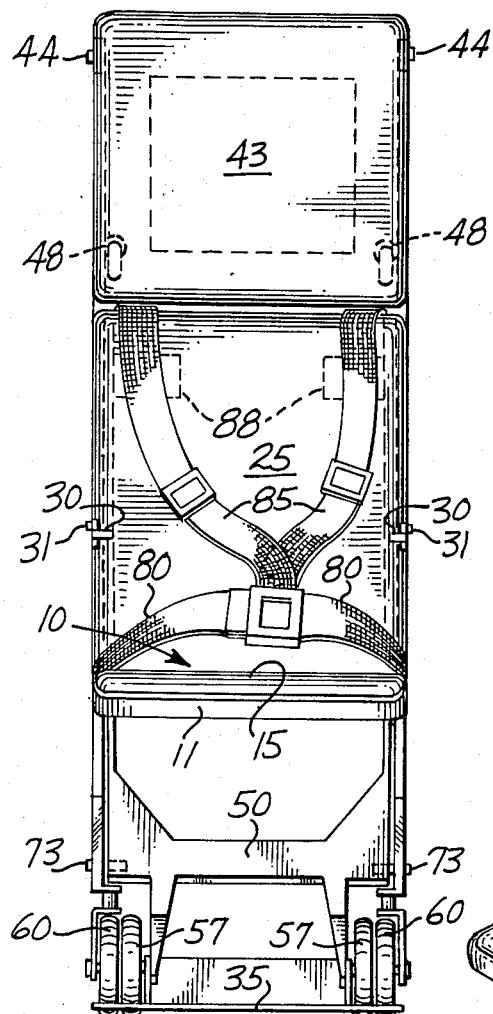
FIG. 2 is a front elevational view of the wheelchair shown in FIG. 1.

The wheelchair embodiment of the invention is illustrated in the following: the isometric projection of FIG. 1; the front view of FIG. 2; and the side view of FIG. 3.

The wheelchair has a back frame structure 20, comprising: a pair of vertically elongated side frame members 21; horizontal, transverse frame members 22; and a backrest panel 24 secured to the pair of vertical side frame members 21 on opposite parallel sides thereof. The frame members 21, 22 and backrest panel 24 integrally form a rigid unitary main structural frame 20 for the wheelchair assembly.

The upper portion of the back frame structure 20 has a headrest cushion 43 which is pivotally and removably mounted by spring biased pivot pins 44 to the back frame structure 20 for upward rotation about pins 44 in order to gain access to a rotatable latch handle 74. As will be more clearly explained infra, the latch handle 74 removably fastens the upper portion of the back frame structure 20 to a vertical support structure or wall 70 when the wheelchair is compactly folded and stowed.

Below the headrest cushion 43 is a contoured seat back cushion 25 which is removably inserted into the seat back frame 20.

Figure 1:
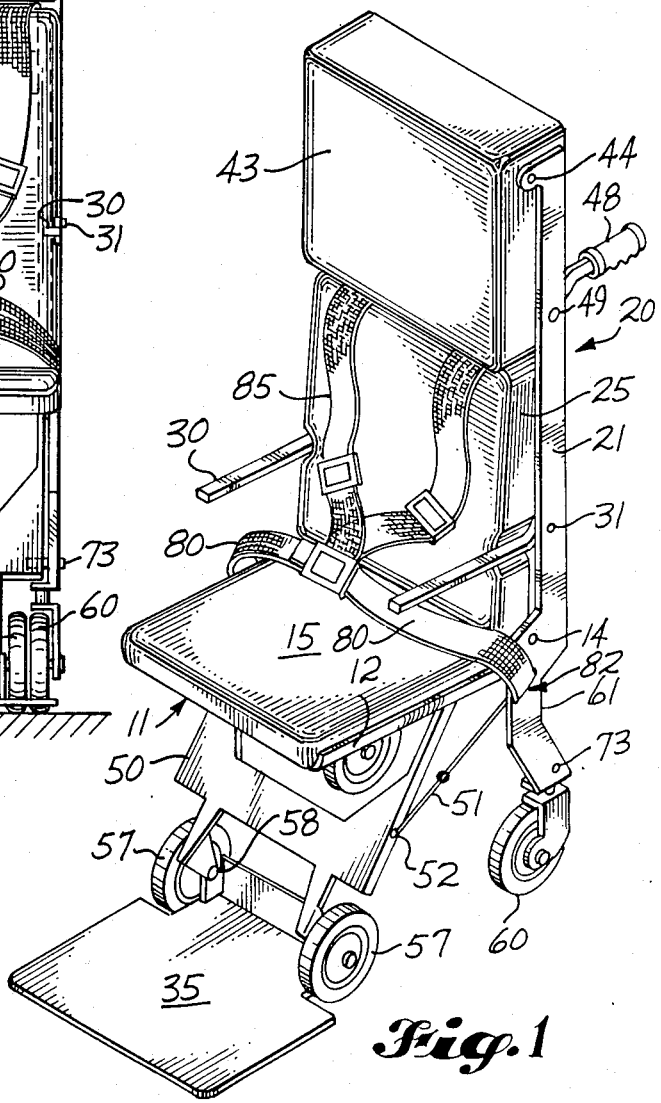
FIG. 1 is an isometric projection of the wheelchair embodiment of the invention.

Stowaway armrests 30 are swingably mounted on pivot pins 31 secured to the vertical side frame members 21 of the back frame structure 20 for movement between the horizontal armrest position shown in FIGS. 1–3 to an upward retracted position shown in FIGS. 4–7.

The lower portion of the back frame structure 20, below the seat attachment pivotal connection 14, forms the rear legs 61 of the wheelchair. Attached to the lower end of the rear legs 61 are castered wheels 60.

A seat frame structure 11, as will be more clearly explained infra, is pivotally supported at its aft end through pins 14 to the vertical back frame members 21; and as the seat frame is lowered to the seating position, the lower end of the seat back cushion 25 moves forward pivoting about the upper end of the seat back cushion 25, at pivot 26; thus being at a slight angle to the vertical back frame structure 20.

Pivotally and slidably connected to the seat frame structure 11, through a slotted arrangement 64 and a locking detent 65, is the upper end of a front leg frame structure 50. The lower end of the front leg frame 50 has a pair of front wheels 57 rotatably mounted thereto at axis 58.

A folding brace 51, connected at 52 to the front wheel leg frame 50 and interconnected at 53 to the back frame structure 20, aids the locking detent 65 in retaining the upper end of the front leg frame 50 and the front wheels 57 in their extended and locked wheelchair position.

A footrest pan 35 projects forwardly from the front wheels 57 in a generally horizontal orientation for use by a wheelchair occupant. The rearward section of the footrest pan 35 is rotatably mounted between the front wheels 57 on pivot axis 58 which is in axial alignment with the front wheel pivot axis.

Stop means (not shown) are incorporated in the rotatable connection 58 of the footrest pan 35 to limit further downward rotation beyond the horizontal position.

An occupant restraint system is utilized for both the wheelchair embodiment and the flight attendant's chair embodiment, and comprises an adjustable seat belt 80 and adjustable shoulder harness straps 85. Both the seat belt 80 and the shoulder straps 85 are anchored to back frame structure 20. The shoulder straps 85 slip through nonbinding strap guide brackets located in a gap between the lower end of the headrest cushion 48 and the upper end of the backrest cushion 25, to reach inertial-reels 88 mounted behind the back cushion 25 and anchored to back frame structure 20. The seat belt 80 is anchored to back frame structure 20 through slot connection 82.

A pair of rearwardly extending stowaway handles 48, for use by a flight attendant in assisting a wheelchair occupant, is pivotally mounted at 49 to the vertical side frame members 21 for rotation between a horizontal position shown in FIGS. 1-3 and vertically upward retracted position shown in FIGS. 4-7.

The flight attendant's seat embodiment of the invention is illustrated in the front view of FIG. 6 and the side view of FIG. 7. This embodiment is mounted to a vertical bulkhead 70 which serves as connective support structure. The downward and rearward force exerted by an occupant on the seat assembly 10 and against the back frame structure 20 are reacted into the vertical bulkhead 70, via both the mounting brackets 72 and the rotatable handle connective means 74, as will be more clearly explained infra.

The seat embodiment must be designed to provide a high degree of safety for a flight attendant occupant, especially during turbulent weather conditions or in the event of an emergency landing.

The flight attendant's seat assembly 10 comprises a rectangular seat pan frame structure 11 which retainably supports a seat cushion 15.

The rectangular seat pan frame structure 11 comprises: a parallel pair of spaced apart side frame members 12, which extend horizontally forward from the vertical back frame structure 20 when the seat is in the occupied or lowered position; and a parallel pair of spaced apart transverse frame members 13 which are rigidly secured at opposite ends to the fore and aft ends of the side frame members 12, thereby forming a rectangular frame structure for insertion of a contoured seat cushion 15.

The rectangular seat pan frame structure 11 is pivotally supported at its aft end through pins 14 to the back frame structure 20.

The upper extents of the front wheel leg frame structure 50 has transversely projecting pins which are pivotally and slidably connected through a length-wise orientated slot 64 in the side frame members 12 of the seat pane frame structure 11.

When the attendant's seat assembly 10 is lowered to a horizontal position for occupancy, the upper end of the front leg frame structure 50 travels in a slot by means of sliding pivot 65 which is spring biased to a rearward position for rotating the flight attendant's seat upward to a retracted and stowed position when unoccupied. By applying a downward force upon the seat when in a horizontal position, the sliding pivot 65 enters a locking detent which retains the seat lowered position until sufficient upward pressure is applied to remove the sliding pivot 65 from the locking detent. For the flight attendant's seat embodiment, the lower end of the front leg frame structure 50 remains in a rearward retracted position such that the front wheels 57 are in coaxial alignment with rear wheels 60; thereby, the front leg frame 50 serves as a brace for the occupied seat assembly 10, and there are no protruding legs or wheels in the adjacent passageway. The downward force exerted upon the seat assembly 10 is reacted through the front and rear legs 50, 61, the wheels 57, 60, and into the floor and wall 70, of the aircraft.

When the seat assembly 10 becomes unoccupied, the seat return spring rotates the seat upwardly about pivot 14 and folds the seat compactly against the back assembly to the stowed position shown in FIGS. 4 and 5.

The compactly folded and stowed embodiment of the invention is illustrated in the front view of FIG. 4 and the side view of FIG. 5.

The wheelchair embodiment, shown in FIGS. 1-3, is foldable in a front-to-back sequence which is quickly and easily accomplished by raising the footrest 35, the flight attendant's seat assembly 10, the armrests 30, and the back handles 48.

Folding the flight attendant's seat embodiment shown in FIGS. 6 and 7 is accomplished automatically through a spring biasing arrangement which is actuated when the seat becomes unoccupied and the front leg sliding pivot is removed from the locking detent 65. The seat continues to rotate upwardly to the retracted position shown in FIGS. 4 and 5 where it is approximately parallel to the back frame structure 20.

The compactly folded assembly, as shown in FIGS. 4 and 5, is mounted on an interior vertical bulkhead or wall 70 by means of a pair of lower U-shaped brackets 72 and an upper rotatable handle or latch 74, which means are fixedly attached to airplane structure. By rotatably raising the headrest cushion 43 about pivot 44, a vertically oriented aperture or slot opening 75, in the back frame structure 20, is exposed. The slot opening 75 is positioned over the vertically oriented latch handle 74, and the latch handle 74 is rotated to a horizontal position after being inserted through the vertically oriented aperture 75, for fastening the back frame structure to the wall 70.

One leg of the U-shaped brackets 72 is fastened to a wall 70 and the other leg projects out from the wall 70 for receiving and supporting transverse pins 73 that are fixed to the rear legs 61 of the back frame structure 20. Both the U-shaped brackets 72 and the upper latch handle 74 should be secured to aircraft structure that can provide a high level of safety to a flight attendant occupant when the invention is utilized in the seat embodiment.

While only a particular embodiment has been disclosed herein, it will be readily apparent to persons skilled in the art that numerous changes and modifications can be made thereto, including the use of equivalent means and devices without departing from the spirit of the invention.

The embodiments of the invention in which an exclusive property or privilege is claimed are defined as follows:

1. A wheelchair assembly, comprising: a back frame having a pair of vertically parallel side frame members and transverse frame members secured between said side frame members for integrally forming a rigid back frame; a seat pan frame extending horizontally forward from said back frame when in position for occupancy and being pivotally supported at its aft end to said back frame for limited articulation between a forward extended, horizontal position for occupancy and a rearward retracted, vertical position for stowage; said seat pan frame having side frame members with a lengthwise orientated slot including a locking detent located at the forward end of the slot; rear legs formed by the lower portion of said back frame; a front leg assembly having an their upper extent with means cooperating within the slots in said seat side frame members for rearward retraction or forward extension movement in said slot, relative to the rear legs when said seat pan frame is articulated from its stowed position to its seating position respectively; said front leg assembly having upper extent locked in a forward extended position by the detent in said slot when an occupancy load is applied to said seat pan frame; a front leg brace comprising a folding linkage having a forward extent connected to the midportion of said front leg assembly and having a rearward extent connected to said back frame for forming a diagonal brace for maintaining the lower extnt of said front leg assembly in a forward extended positon; and wheels mounted to the lower end of the front leg assembly and the rear legs for rolling movement of the wheelchair assembly.

2. A wheelchair assembly as set forth in claim 1, including: a footrest platform extending horizontally and forwardly and being pivotally mounted at its rear end from the lower end of the front legs for rotation about a transverse axis, to a folded position lying against the front legs.

3. A wheelchair assembly as set forth in claim 1 including: side armrests pivotally mounted to the back frame for swinging in an arc between a horizontal, outward extended, armrest position and a vertical, upward retracted position adjacent to said pair of vertically parallel side frame members.

4. A wheelchair assembly as set forth in claim 1, including: attendant assist handles pivotally mounted to the back frame for swinging in an arc between a horizontal, rearward extended, attendant assist position and a vertical, upward retracted position adjacent to said pair of vertically parallel side frame members.

5. A wheelchair assembly as set forth in claim 1, wherein: said front wheels being mounted for fixed directional alignment and said rear wheels being caster mounted for providing directional steering control of the wheelchair.

6. A wheelchair assembly as set forth in claim 1, including an occupant restraint system, comprising: a seat belt for fastening across lap of occupant to securely hold wearer to said seat pan frame; an inertia-reel securely mounted to said back frame; a shoulder harness having straps passing over shoulders of occupant and with one end of the straps connected to the inertia-reel and their other ends designed to join with a seat belt fastener; whereby occupant is prevented from being thrown around causing injury as a result of sudden violent movement.

* * * * *

UNITED STATES PATENT AND TRADEMARK OFFICE
CERTIFICATE OF CORRECTION

PATENT NO. : 4,678,202

DATED : July 7, 1987

INVENTOR(S) : Tom M. Jensen et al.

It is certified that error appears in the above-identified patent and that said Letters Patent is hereby corrected as shown below:

The term of this patent subsequent to February 3, 2004 has been disclaimed.

Signed and Sealed this

Eighteenth Day of August, 1987

Attest:

DONALD J. QUIGG

Attesting Officer     Commissioner of Patents and Trademarks